US011840377B2

(12) United States Patent
Pater et al.

(10) Patent No.: US 11,840,377 B2
(45) Date of Patent: Dec. 12, 2023

(54) SELF-CLOSING VALVE WITH INDENTATIONS IN VALVE HEAD CONTOUR

(71) Applicant: Weener Plastics Group B.V., Ede (NL)

(72) Inventors: Marcel Pater, Doorn (NL); Alwin Mertens, Apeldoorn (NL); Sebastiaan Wilhelmus Josephus Den Boer, Twello (NL); Lenny Marita Ellenkamp-Van Olst, Doetinchem (NL)

(73) Assignee: Weener Plastics Group B.V., Ede (NL)

( * ) Notice: Subject to any disclaimer, the term of this patent is extended or adjusted under 35 U.S.C. 154(b) by 51 days.

(21) Appl. No.: 17/439,585

(22) PCT Filed: Mar. 17, 2020

(86) PCT No.: PCT/NL2020/050177
§ 371 (c)(1),
(2) Date: Sep. 15, 2021

(87) PCT Pub. No.: WO2020/190134
PCT Pub. Date: Sep. 24, 2020

(65) Prior Publication Data
US 2022/0153486 A1 May 19, 2022

(30) Foreign Application Priority Data
Mar. 19, 2019 (NL) ...................................... 2022766

(51) Int. Cl.
*F16K 15/14* (2006.01)
*B65D 47/20* (2006.01)

(52) U.S. Cl.
CPC ...... *B65D 47/2031* (2013.01); *F16K 15/1471* (2021.08)

(58) Field of Classification Search
CPC ............... B65D 47/2031; F16K 15/147; F16K 15/1471
See application file for complete search history.

(56) References Cited

U.S. PATENT DOCUMENTS 1,738,080 A 12/1929 Smith
4,222,126 A * 9/1980 Boretos ................ F16K 15/147 137/849
(Continued)

FOREIGN PATENT DOCUMENTS

CN 108025835 A 5/2018
EP 2543781 A1 * 1/2013 ............ E03F 5/0405
(Continued)

OTHER PUBLICATIONS

Machine translation of EP 2543781.*
Chinese Patent Application No. 202080028008.2, First Office Action, datedMar. 10, 2023, 11 pages.

*Primary Examiner* — Kevin F Murphy
(74) *Attorney, Agent, or Firm* — Hoffmann & Baron, LLP

(57) ABSTRACT

A self-closing dispensing valve is made of an elastic material and includes a valve head with a dispensing orifice, a circular peripheral retaining flange spaced apart from the valve head in an axial direction, and a connecting sleeve integrally connected with the valve head on one end and the retaining flange on another end. The dispensing orifice is formed by at least three slits in the valve head, where the slits converge at a centre of the valve head and are angularly evenly distributed around the centre of the valve head. The valve head includes a number of lobes, where in each of the lobes at least one of the slits is formed. Each of the lobes has a tip region on a radial outer end of the lobe, where the tip regions of the respective lobes lie approximately on an imaginary circle.

18 Claims, 9 Drawing Sheets

(56) References Cited

U.S. PATENT DOCUMENTS

| | | | | |
|---|---|---|---|---|
| 6,382,255 | B2 * | 5/2002 | McFarland | F16K 15/147 137/849 |
| 6,726,063 | B2 | 4/2004 | Stull et al. | |
| 8,844,572 | B2 * | 9/2014 | Stanaland | F16K 15/147 137/849 |
| 10,295,073 | B2 * | 5/2019 | Hall | F16K 15/147 |
| 2004/0251278 | A1 * | 12/2004 | Arai | B65D 47/2031 222/212 |
| 2010/0163584 | A1 | 7/2010 | Wellman | |
| 2017/0088318 | A1 | 3/2017 | Franca et al. | |

FOREIGN PATENT DOCUMENTS

| | | | |
|---|---|---|---|
| WO | 2008/074517 | A2 | 6/2008 |
| WO | 2008/097306 | A1 | 8/2008 |
| WO | 2008/104029 | A1 | 9/2008 |
| WO | 2017/058613 | A1 | 4/2017 |

* cited by examiner

SELF-CLOSING VALVE WITH INDENTATIONS IN VALVE HEAD CONTOUR

CROSS-REFERENCE TO RELATED APPLICATIONS

This application is the National Stage of International Application No. PCT/NL2020/050177, filed Mar. 17, 2020, which claims the benefit of Netherlands Application No. 2022766, filed Mar. 19, 2019, the contents of which is incorporated by reference herein.

FIELD OF THE INVENTION

The invention relates to a self-closing dispensing valve made of an elastic material comprising a valve head with a dispensing orifice, a circular peripheral retaining flange spaced apart from the valve head in an axial direction, and a connecting sleeve integrally connected with the valve head on one end and the retaining flange on another end. The dispensing orifice is formed by at least three slits in the valve head, wherein said slits converge at a centre of the valve head and are angularly evenly distributed around the centre of the valve head.

BACKGROUND OF THE INVENTION

Certain types of self-closing valves are well known, and an example is shown in WO 2008/074517. FIGS. 3 to 5 of WO 2008/074517 show a self-closing valve integrally formed of silicone rubber by injection moulding. It has a valve head with a circular outer contour, a concave outer surface and a convex inner surface. The valve furthermore has a circular retaining flange at an axial distance from the valve head, by which the valve can be fixed to a dispensing closure. The axially offset valve head and retaining flange are connected by a connector sleeve which has substantially a cylindrical or a frusto-conical shape. The valve is placed and fixed to a dispensing closure which is adapted to be coupled to a container with a dispensible content such as foodstuffs, e.g. ketchup or other sauces, or such as cosmetic or care products. The valve head is provided with slits which form a dispensing orifice which opens upon pressurization of the container.

Although silicone valves are very fit for their purpose they pose a problem after use, when the user throws away the container with the dispensing closure in which the valve is still fixed. The containers and the dispensing closure are usually made of a recyclable plastics material such as PET, PE or PP. However, the silicone material cannot be recycled and therefore disturbs the recycle streams of the containers and closures.

WO 2008/104029 A1 discloses a self-closing valve which contains two bodies. This valve made up of the two bodies is moulded using a co-injection/bi-material moulding process. The first body is formed of a HDPE and once set the first body is placed into a second mould and the second body is formed thereover from silicon. The second body is locked to the first body by holes in the first body through which plugs of silicon the second body are moulded. This valve in itself poses already the above mentioned recycling problem.

One way to circumvent the recycling problem is to separate the self-closing valves from the closures during recycling. In WO 2008/097306 a method is disclosed for flotation separation of silicone and plastic. The document describes as an example plastic bottles with a valve diaphragm made of cured silicones which can be separated by using a low-gravity silicone for the valves which allows the materials to be separated and the plastic can be recycled.

Another way to circumvent the recycling problem is to use another material for the self-closing valves. For example in U.S. Pat. No. 6,726,063 it is proposed to make the self-closing valve from a thermoplastic elastomer (TPE), which has the advantage that it can be processed and recycled like thermoplastic materials, which makes it is easier to recycle scrap because the TPE of the valves and the thermoplastic materials of the other package items, such as closures and containers does not have to be separated but can be processed together. U.S. Pat. No. 6,726,063 shows many valves with different slit shapes and positions in the valve head to enhance the control of dispensing through the valve head.

A disadvantage of TPE compared to silicone rubber for self-closing dispensing valves is that TPE grades having similar mechanical properties as the used silicone materials are often not suitable for use with different food products. In particular when used with fatty food products, the TPE grades which have similar mechanical properties as silicone materials show too much migration of agents into the food product. TPE grades which are suitable for use with fatty foods are typically stiff and cannot be used with known valve designs used in the food packaging industry.

The present invention has for an object to provide an improved self-closing dispensing valve, which is compatible with the dispensing of fatty foodstuffs but avoids the use of silicone materials.

SUMMARY OF THE INVENTION

This object is achieved by a self-closing dispensing valve made of an elastic material comprising a valve head with a dispensing orifice, a circular peripheral retaining flange spaced apart from the valve head in an axial direction, and a connecting sleeve integrally connected with the valve head on one end and the retaining flange on another end,

- wherein the dispensing orifice is formed by at least three slits in the valve head, wherein said slits converge at a centre of the valve head and are angularly evenly distributed around the centre of the valve head,
- wherein the valve head comprises a number of lobes, wherein in each of said lobes at least one of said slits is formed,
- wherein each of the lobes has a tip region on a radial outer end of the lobe, wherein the tip regions of the respective lobes lie approximately on an imaginary circle, and
- wherein consecutive tip regions are interconnected by an indentation formed in the peripheral contour of the valve head relative to a circle shape, and
- wherein the connector sleeve has a shape defined by contour lines, wherein said contour lines in the axial direction from the valve head to the flange make a gradual transition of the lobed shape of the outer contour of the valve head to the circular inner contour of the retaining flange.

The valve is made as a single body. A single material or material blend is used to form the valve body, preferably a TPE, another elastomer or a plastomer material. When a pressure is applied from the interior side of the valve by pressurizing the container from which a substance has to be dispensed, the indentations in the peripheral contour of the valve head and in the adjoining connector sleeve portions, which initially have a concavely curved shape on the outer side, are pushed outward by the inner pressure, whereby the concavely curved shape is straightened to a less curved shape. This straightening of the indentation of the sleeve and the contour of the valve head pulls the valve head flaps adjacent the slits outwardly whereby the slits are pulled open. The particular indented outer contour of the valve head and the adjoining portion of the connector sleeve according to the invention promotes that the slits are opened more in a radial direction, rather than being opened in the axial direction, which is often the case with prior art valves. It was found that this way of radial opening is needed to obtain a sufficiently wide opening of the slits using the stiffer material, in particular if another elastic material than silicone rubber is used, for example TPE or other elastomer or plastomer material, which is preferred in view of recycling of materials.

Preferably one slit extending towards the centre of the valve head is formed in each lobe. In these preferred embodiments the number of lobes thus corresponds to the number of slits in the valve head extending towards the centre thereof.

It is noted that the lobed valve head has some resemblance with a dispensing duckbill valve, as is for example shown in U.S. Pat. No. 1,738,080, in which the valve head has two opposed raised lips separated by one single slit which is opened in the transverse direction upon pressurization from the inside. A difference however, between a duckbill valve and the valve according to the invention is that the valve head according to the invention has multiple slits which converge at the centre of the valve head which converging slits define multiple valve head flaps between them which also allow opening of the valve when the pressure on the outside of the valve exceeds the pressure on the inside of the valve. The latter may for example occur when a container, such as a squeeze bottle is squeezed by the user to dispense substance and then is released, after which the container due to its elastic properties wants to return to its original shape. This causes an underpressure or vacuum in the container. This underpressure or vacuum can be relieved by allowing venting air to pass through the valve head by allowing the mentioned valve head flaps to move elastically inwards and provide a venting orifice.

In a preferred embodiment of the self-closing valve according to the invention the outer contour of the valve head has substantially a cross shape, wherein the valve head has four slits extending from the centre of the valve head into the arms of the cross shape. In this embodiment the lobes of the valve head correspond thus with the arms of the cross shape. The cross shaped valve head has the advantage that the indentations in the outer contour of the valve head and the adjoining connector sleeve portions are relatively deep, in other words that the contour has a significant concave curvature on the outer side. It was found that this shape further opens the slits than in an embodiment wherein the indentations are more shallow, thus the concave curvature has a larger radius of curvature.

The indentation facilitates the opening of the valve, because it promotes a movement of the valve head flaps in a radial direction thereby moving the flaps of the valve head apart and opening the slits. However, a disadvantage of this indentation occurs when the valve is closed and an underpressure occurs in the container under the valve. The radial force applied on the indentations then forces the valve head flaps towards each other and hinders the opening of the valve to allow suck back, wherein air can flow into the container to relieve the underpressure. Suck back is important to remove an underpressure when the valve is used with a squeeze-type container, which has to return to its original shape after it has been squeezed. To promote suck back, notwithstanding the valve head contour with indentations, the cross sectional curvature of the adjoining connector sleeve towards the edge of the valve head is designed such that the adjoining connector sleeve portions provide a minimal radial force towards the centre axis of the valve.

Another factor in promoting suck back with the valve according to the invention is the curvature of the concave shape of the valve head. The larger the curvature, the more the forces generated by an underpressure on the interior side of the valve head will force the valve head flaps outwardly in radial direction.

In another preferred embodiment of the self-closing valve according to the invention the outer contour of the valve head has generally a three point star shape and the valve head has three slits extending from the centre of the valve head into the respective points of the star shape. It was found that if the valve head has less lobes, in this embodiment three lobes, which results generally in a three point star shape, a bigger plane dispensing opening is achieved when the valve is pressurized from the interior side. This may be advantageous when certain substances with a certain viscosity have to be dispensed. In particular this shape may be advantageously used with substances having a high viscosity or for example sauces containing small particles.

In yet another embodiment of the self-closing valve according to the invention the outer contour of the valve head has substantially a five point star shape and the valve head has five slits extending from the centre of the valve head into the respective points of the star shape. This embodiment of the valve thus has five lobes and five slits. It was found that this five-lobed valve head provides a smaller dispensing orifice when the valve is pressurized from the interior side, which may be advantageous for dispensing particular substances, for example when a decorative effect is to be achieved. In known applications where a star shaped dispensing orifice is used, e.g. for the dispensing of cream on pastry, the orifice is fixed and does not provide a clean cut-off. With the present embodiment of the valve according to the invention a decorative beam of substance can be dispensed together with a clean cut-off of the beam after the dispensing is stopped.

In a possible embodiment the slits are rectilinear. It is however also possible to provide slits having at least partly a curved portion. By varying the shapes of the slits, the shape of the valve orifice in an open dispensing state can be varied. This can be utilized for some substances to be dispensed which remain form stable after dispensing, such as for example cream, cake icing or a thick mayonnaise.

In a preferred embodiment the valve head has a concave upper surface or exterior surface. The concave shape provides the effect that the valve opens at a threshold pressure. This can be desirable when for example the valve is applied in a closure for a container which might get shaken, which creates a small pressure on the valve, at which the valve should not open. The degree of concavity determines the threshold pressure, the more concave the upper surface is, the higher the threshold pressure.

The radially most inward point of the respective indentations lie preferably on an imaginary inner circle delimiting a centre region of the valve head.

In a preferred embodiment the valve has a smaller thickness at said centre region of the valve head than in the remainder of the valve. Preferably said remainder of the valve has a uniform wall thickness. In a practise the valve may have for example a wall thickness of about 0.2 mm at the centre region of the valve head and a wall thickness of about 0.3 mm in the remainder of the valve.

It is also possible that the valve head has a thickness taper towards the centre. This makes the reventing or suck back of air and thus relief of underpressure in a squeezed container easier.

In a possible embodiment the centre region of the valve head has a dome shape.

In another possible embodiment the centre region of the valve head has a conical shape.

Also an embodiment having partly a dome shape and partly an conical shape is possible.

In a possible embodiment the valve has an overall uniform wall thickness. This is the easiest to manufacture in view of the melt flow in the mould. However also more complex variations are possible.

It is for example possible to make a thinner region around the edge of the valve head, this might be formed as a recessed area preferably on the inner side of the valve. This thinner region facilitates the axial opening of the valve head whereby an increased opening can result.

Another option is to provide a variation in the wall thickness of the connector sleeve, by which the radial opening of the valve head may be improved.

Another option would be to provide folding lines (e.g. a line of thinner wall thickness) in the connector sleeve, in particular extending from a centre of the indentation at the valve head to the peripheral retaining flange. These folding lines would enhance the deformation of the connector sleeve and thereby the radial opening of the valve head.

The invention also relates to a dispensing closure including a self-closing valve as described in the above, said dispensing closure comprising a plastic closure body adapted to be placed on a container a substance to be dispensed, said closure body having a dispensing opening, wherein a seat is formed around the dispensing opening, and wherein the retaining flange of the valve is placed in the seat and fixed thereto. Alternatively, the valve may be fixed to a retainer ring, which is then fitted and fixed in the closure body, e.g. by a snap fit.

Self-closing valves made of silicone materials are generally made by an injection moulding process. However, the mentioned non-silicone materials, such as certain TPE grades or plastomeres, that are compatible with (fatty) food substances, in general have quite a low Melt Flow Index (MFI). This low MFI makes it difficult to process these materials in an injection moulding process, in particular in case the wall thicknesses are as small as is desired for the production of self-closing valves of the present invention, i.e. about 0.2-0.3 mm.

The invention therefore also proposes a method for manufacturing a self-closing dispensing valve as described in the above, wherein the valve is made by injection compression moulding of an elastomer or a plastomer. In the injection compression moulding process an amount of resin (or putty) is injected in a closed mould after which the mould halves are moved towards each other, thereby compressing and distributing the resin in the mould cavity.

However, if the MFI of the material to be moulded allows it, a method for manufacturing a self-closing dispensing valve according to the invention can also include injection moulding the valve from an elastomer material, such as TPE, or a plastomer.

By the mentioned injection moulding or injection compression moulding processes a single body is moulded from an elastic non-silicone material, such as TPE, or another elastomer or plastomer material.

The invention will be elucidated in the following detailed description with reference to the drawings.

DETAILED DESCRIPTION OF THE INVENTION

Figure 1:
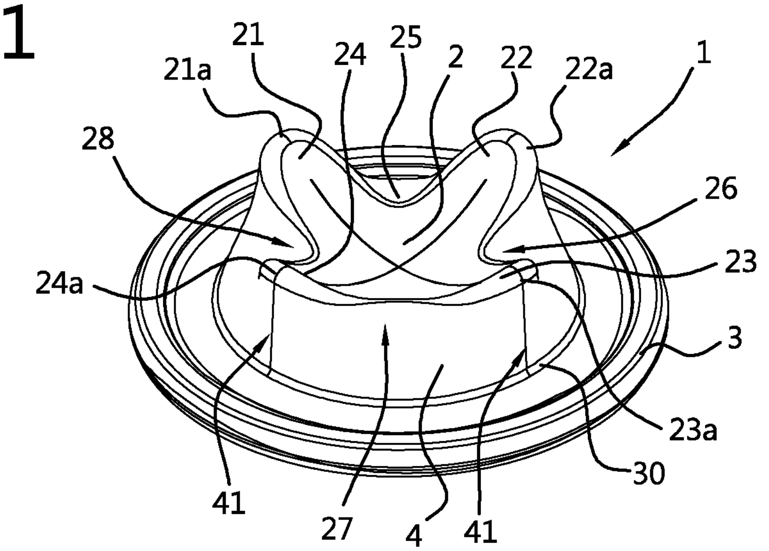
FIG. 1 shows a view in perspective from the top of a self-closing dispensing valve according to the invention.

FIGS. 1-4 show in different isometric views a possible embodiment of a self-closing dispensing valve. The self-closing dispensing valve is indicated by reference numeral 1, and comprises a valve head 2 and a peripheral flange 3. The valve head 2 and the peripheral flange 3 are spaced apart in an axial direction of the valve 1, and are interconnected by a connector sleeve 4. The peripheral flange 3 is circular in this embodiment and is adapted to be secured in a dispensing closure for a container.

The valve 1 is made of a single material, in particular moulded by a single moulding process, such as injection moulding or injection compression moulding. A single valve body made of one material, e.g. TPE, is the result.

The valve head 2 has a lobed shape, in this specific embodiment having four lobes 21-24. This is visible in FIGS. 5 and 6, which show a top view and a bottom view respectively of the valve 1.

Figure 5:
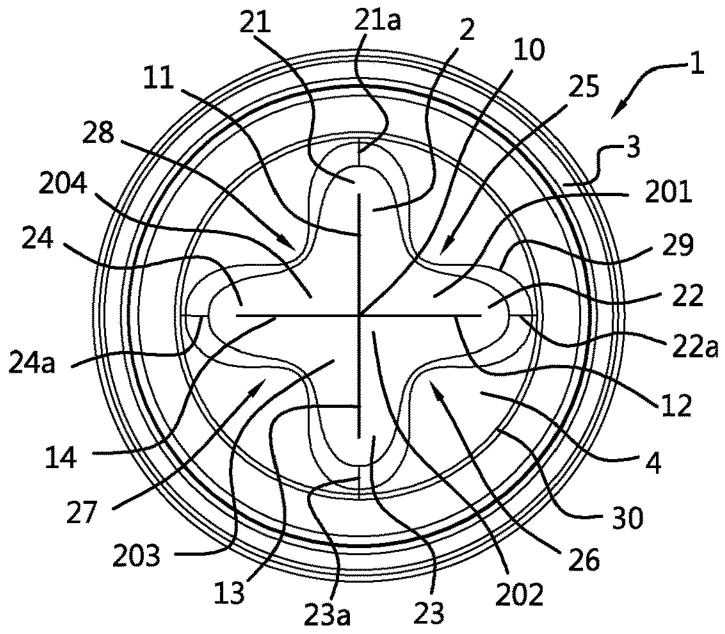
FIG. 5 shows a top view of the self-closing dispensing valve of FIG. 1.
Figure 6:
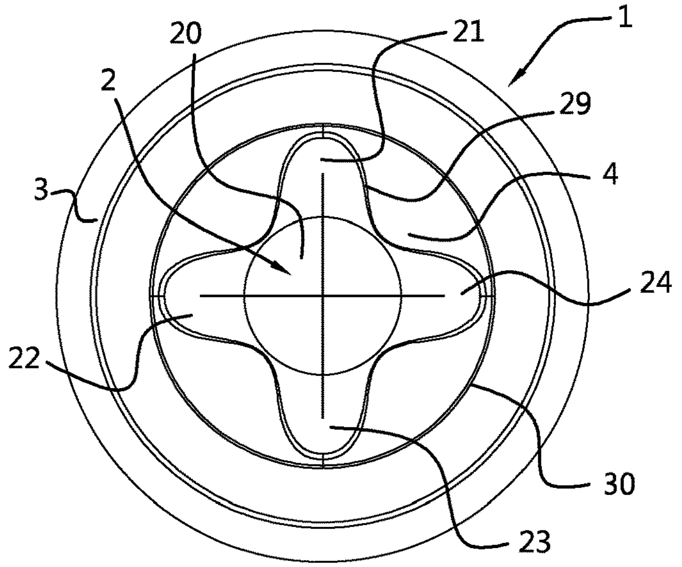
FIG. 6 shows a bottom view of the self-closing dispensing valve of FIG. 1.
Figure 7:
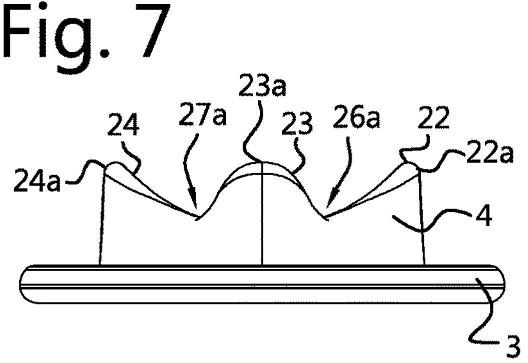
FIG. 7 shows a side elevational view of the self-closing dispensing valve of FIG. 1.
Figure 8:
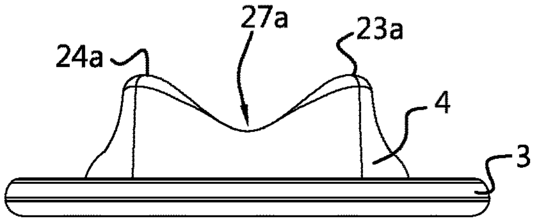
FIG. 8 shows another side elevational view of the self-closing dispensing valve of FIG. 1.

The valve head 2 has four slits 11-14 which converge at the centre 10 of the valve head 2 as is best visible in FIG. 5. The slits 11-14 are evenly distributed, thus there is each time a 90° angle between two consecutive slits. Each lobe 21-24 has its corresponding slit 11-14. The slits 11-14 define the dispensing orifice of the valve 1, when the valve 1 is subjected to a pressure from the container with which it is assembled. Between two slits 11-14 valve head flaps 201-204 are defined.

Each of the lobes 21-24 has a tip region **21*a*-24*a* on a radial outer end of the lobe 21-24. The tip regions 21*a*-24*a* of the respective lobes 21-24 lie approximately on an imaginary circle, which may be best seen in FIG. 5. Consecutive tip regions 21*a*-24*a* are interconnected by an indentation 25-28 formed in the peripheral contour 29 of the valve head 2 relative to a circle shape. The outer contour of the valve head 29 in this embodiment thus has substantially a rounded cross shape, wherein the four slits 11-14 extend from the centre 10 of the valve head 2** into the arms of the cross shape.

The imaginary circle on which the tip regions of the respective lobes lie has in the embodiment shown in the figures a similar diameter as the inner contour of the flange 3, which is best visible in the cross sectional view of FIG. **9*a*. A radial outer portion of the connecting sleeve 4 extends between the retaining flange 3 and each one of the tips of the lobes. In an unloaded state of the valve 1, this radial outer portion of the connector sleeve extends substantially parallel to the centre axis 10 of the valve 1**.

It is however also possible that the mentioned imaginary circle the tip regions of the respective lobes lie has a smaller diameter than the inner contour of the retaining flange. In such an embodiment a radial outer portion of the connecting sleeve extending between the retaining flange and each one of the tips of the lobes has an inclination with respect to the axial direction of the valve, such that the radial outer portions of the connector sleeve define an imaginary frustoconical shape.

Figure 11:
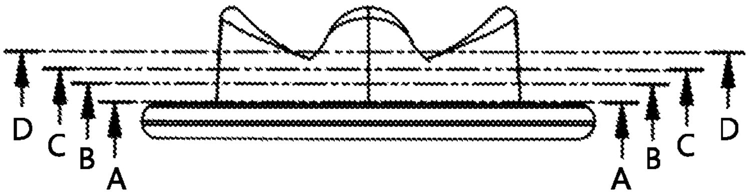
FIG. 11 shows a side elevational view of the valve of FIG. 1 with the indication of four cross section planes.
Figure 11A:
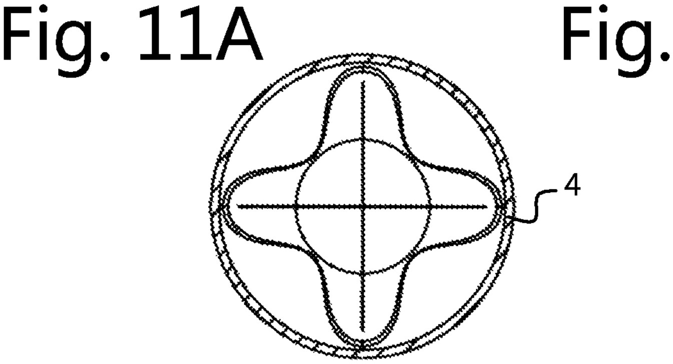
FIG. 11*a* shows a cross section along A-A indicated in FIG. 11.
Figure 11D:
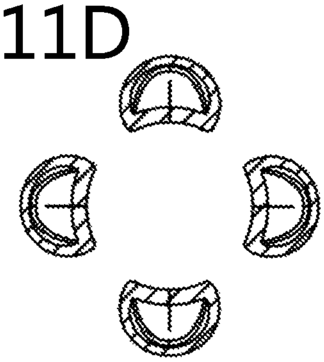
FIG. 11*d* shows a cross section along D-D indicated in FIG. 11, FIGS. 12*a*-12*d* show in a top view the valve of FIG. 1 in different states of opening.
Figure 11B:
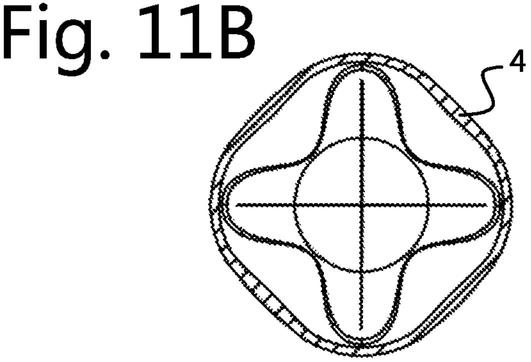
FIG. 11*b* shows a cross section along B-B indicated in FIG. 11.
Figure 11C:
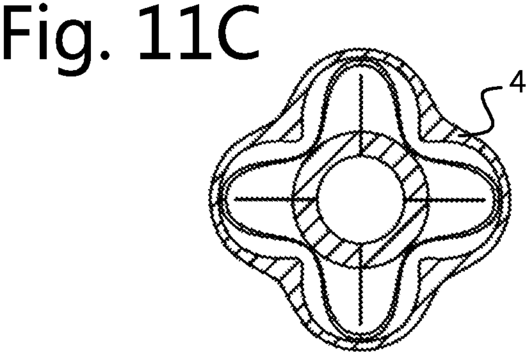
FIG. 11*c* shows a cross section along C-C indicated in FIG. 11.

The connector sleeve 4 has a shape defined by contour lines. In the axial direction from the flange 3 to the valve head 2 the contour lines make a gradual transition of the circular inner contour 30 of the retaining flange 3 to the lobed shape of the outer contour 29 of the valve head 2. This can be best be derived from the FIGS. 11 and **11*a*-11*c*. In FIG. 11*a* the connector sleeve is seen in cross section A-A indicated in FIG. 11, and has a circular shape. The cross section B-B, which is shown in FIG. 11*b* is located closer to the head 2 and it is visible that the circular shape of the connector sleeve 4 has developed to a rounded square shape. The cross section C-C, which is shown in FIG. 11*c* is located still further towards the valve head 2 and it is visible that the shape of the connector sleeve 4** has developed on that height to a lobed shape.

Figure 9:
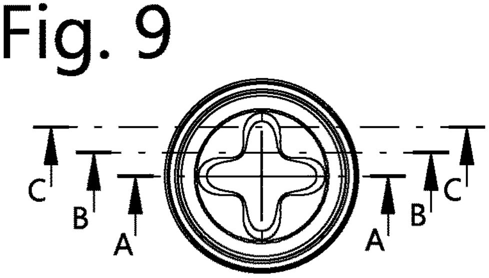
FIG. 9 shows a top view of the valve of FIG. 1 with the indication of three cross section planes.
Figure 10:
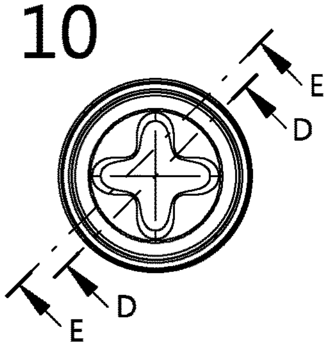
FIG. 10 shows a top view of the valve of FIG. 1 with the indication of two cross section planes.
Figure 9A:
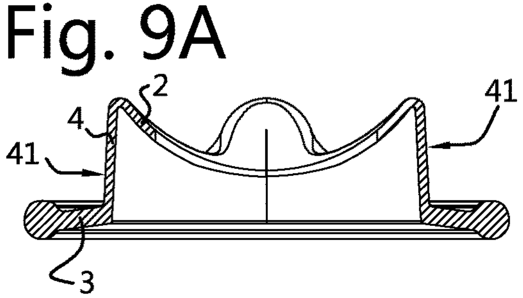
FIG. 9*a* shows a cross section along A-A indicated in FIG. 9.
Figure 10A:
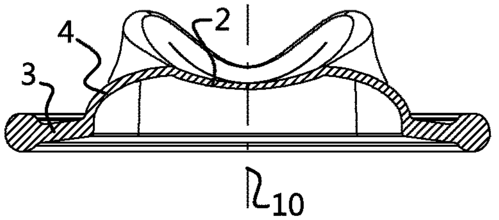
FIG. 10*a* shows a cross section along D-D indicated in FIG. 10.
Figure 10B:
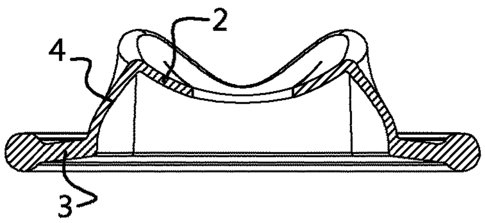
FIG. 10*b* shows a cross section along E-E indicated in FIG. 10.

In FIGS. 9 and 10 other cross sections through the valve 1 are shown. In FIG. **9*a* is shown a cross section A-A through the centre of two opposite lobes 22-24. In that cross section the connector sleeve 4 extend substantially straight from the flange 3 towards the head 2. In FIG. 10*a* is shown a diagonal cross section D-D through the centre 10 of the valve head 2 as indicated in FIG. 10. In this cross section the connector sleeve 4 from the flange 3 towards the valve head 2** follows a curve with a continuously decreasing slope.

Figure 9B:
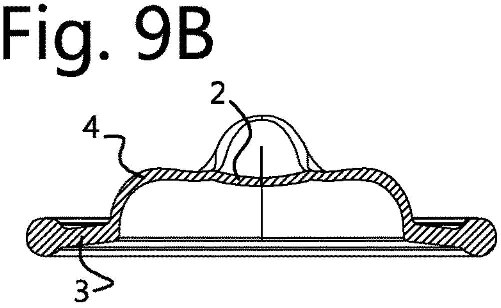
FIG. 9*b* shows a cross section along B-B indicated in FIG. 9.
Figure 9C:
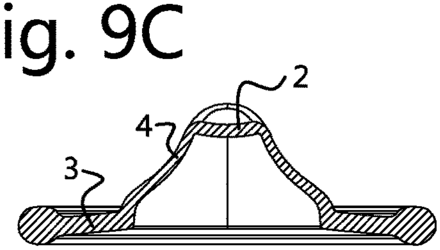
FIG. 9*c* shows a cross section along C-C indicated in FIG. 9.

In FIG. **9*b* is shown that the connector sleeve 4 in the cross sectional view B-B indicated in FIG. 9, initially has a steep slope, then has a convex outer surface with decreasing slope and then a concavity with a slightly increasing slope towards the valve head 2. In FIG. 9*c* is shown that the connector sleeve 4 in the sectional view C-C indicated in FIG. 9, which is a cross section more towards the tip of the lobe 21, has a double curved course which an initial convex outer surface with a decreasing slope which changes over quite close to the flange 3** to a concave outer surface with an increasing slope.

Figure 2:
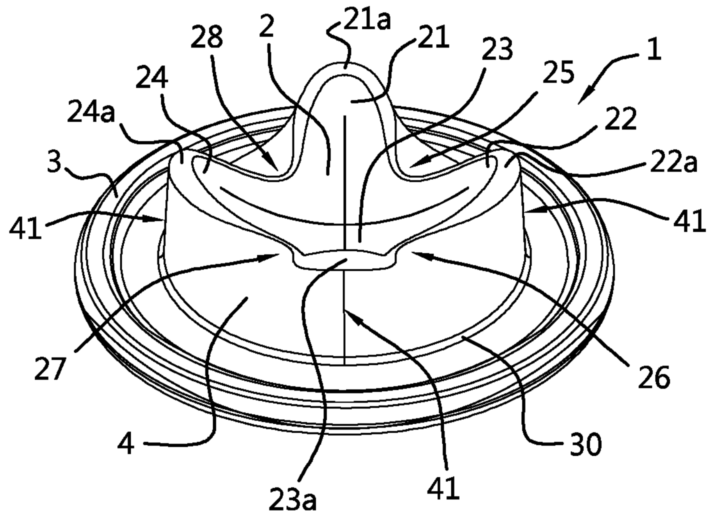
FIG. 2 shows another view in perspective from the top of the self-closing dispensing valve of FIG. 1.
Figure 3:
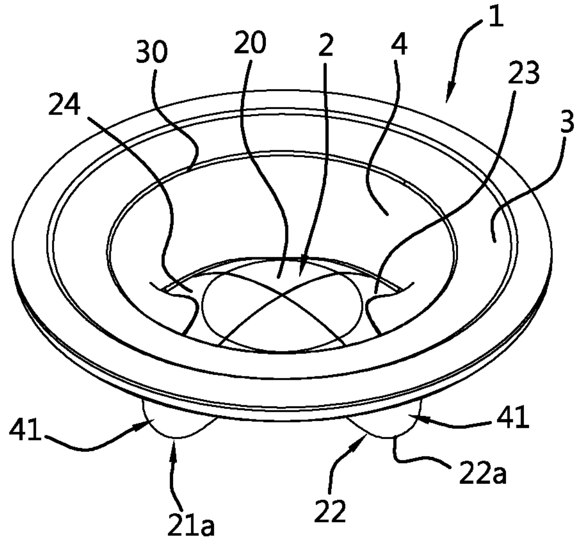
FIG. 3 shows a view in perspective from the bottom of the self-closing dispensing valve of FIG. 1.
Figure 4:
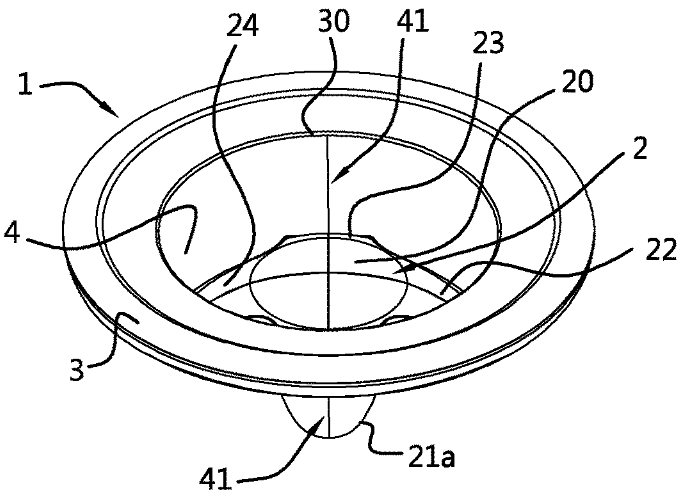
FIG. 4 shows another view in perspective from the bottom of the self-closing dispensing valve of FIG. 1.

The valve head 2 has a concave upper surface as can be best seen in FIGS. 1 and 2. Thereby the radial outer ends **21*a*-24*a* of the lobes 21-24 are located on an axial distance from the radially seen most inward point 25*a*-28*a* of the indentations 25-28, as can be seen in FIGS. 1, 2, 7 and 8. The radial most inward points 25*a*-28*a* of the indentations 25-28 are located on an imaginary circle which defines a centre region 20 of the valve head 2, which can be best seen in FIGS. 3, 4 and 6**.

In the shown embodiment the centre region 20 of the valve head 2 has a dome shape as can be best seen FIGS. 1-4 and FIG. **9*a***. It is also possible to have a centre region of the valve head which has a conical shape. This improves suck back of air through the valve head and thus reventing a container in which an underpressure is created.

The valve 1 is preferably made of TPE grade or another elastomer material which is compatible with the products to be dispensed, in particular food products, such as sauces, without the risk of migration of agents from the elastomer material into the products to be dispensed. Also plastomer materials with this property may be used.

In a practical embodiment the valve 1 preferably has a constant wall thickness of about 0.3 mm. Only in the centre region 20 of the valve head 2 the thickness may be smaller, e.g. in practice 0.2 mm. Preferably the wall thickness of the centre region 20 of the valve head 2 is constant, but it may also have a thickness taper towards the centre 10. The smaller wall thickness in the central region 20 of the valve head facilitates a swivelling of the valve flaps in the axial direction of the valve 1.

Figure 12A:
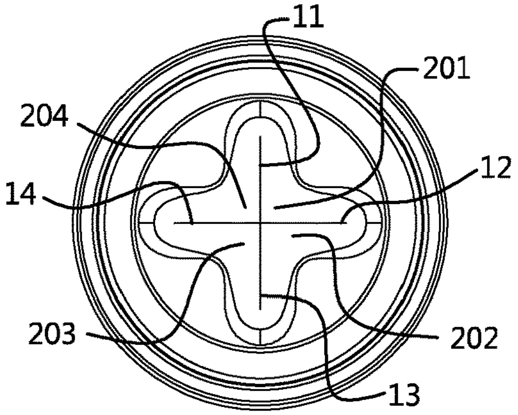
Figure 12B:
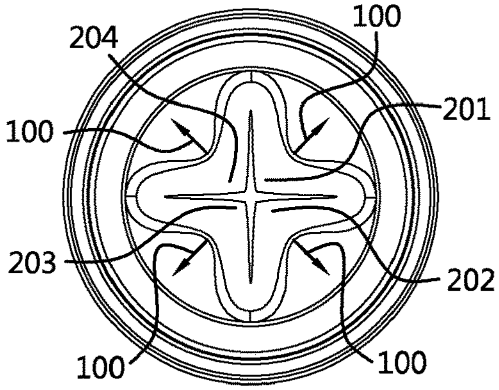
Figure 13A:
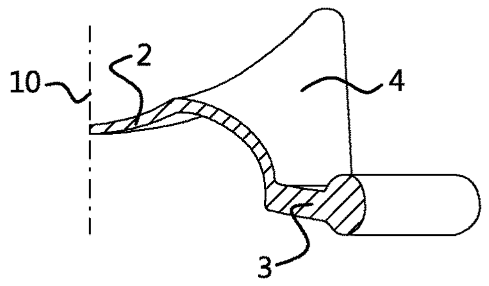
FIGS. 13*a*-13*e* show in a view in perspective ⅛ part of the valve of FIG. 1 in different states of opening.

In the FIGS. **12*a*-12*d* and 13*a*-13*e* the opening of the valve 1 is illustrated. The valve head 2 includes four valve flaps 201-204 divided by the slits 11-14. In FIG. 12*a* the valve 1 is shown in rest and in FIG. 13*a* a ⅛ part of the valve 1** in a corresponding state.

In FIG. **13*b* is shown a state in which a pressure has been built up on the interior side underneath the valve head. Thereby the valve flap 201 has moved upwards compared to FIG. 13*a*. However, the valve flaps 201-204 are still engaging each other and the valve 1** is still closed.

Figure 12C:
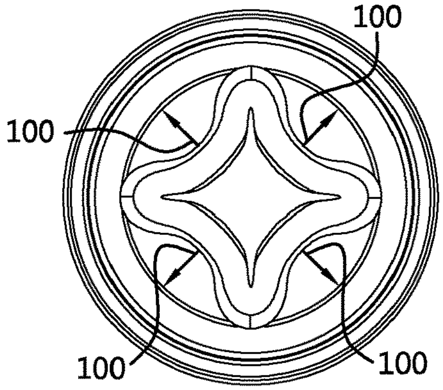
Figure 12D:
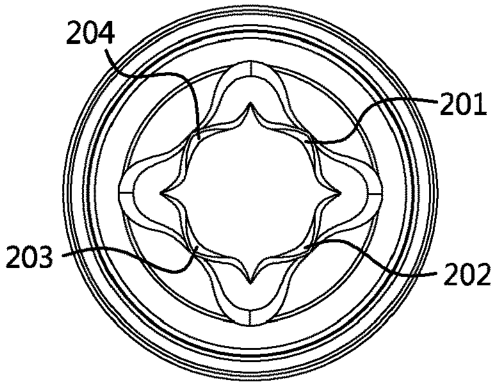
Figure 13B:
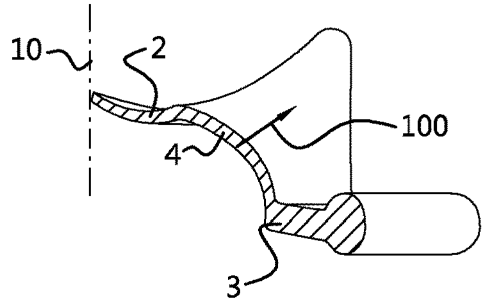
Figure 13C:
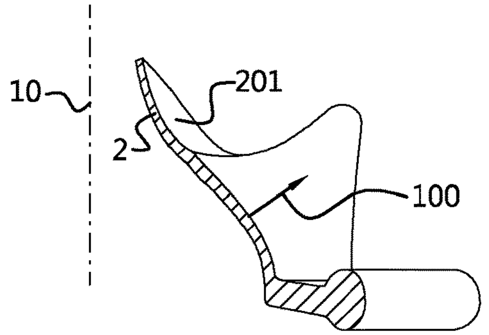
Figure 13D:
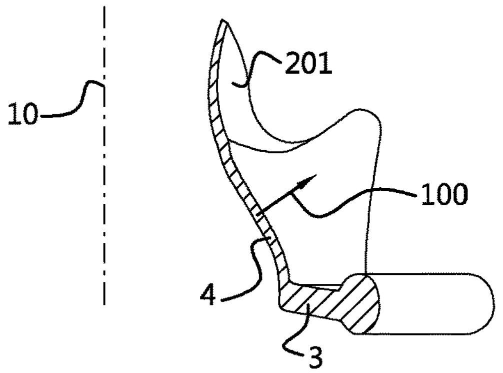

In FIG. **12*b* a state is shown in which the slits of the valve 1 start to open. This is due to the axial movement of the flaps 201-204, but also because the inside pressure pushes the connector sleeve 4 at the indentations. This effect is illustrated by radially outwardly pointing arrows 100. This latter effect can be seen also in the difference between FIGS. 13*a* and 13*b*, in which one can see a slight outward movement of the connector sleeve 4. In FIG. 12*c* and FIG. 13*c* is visible that the connector sleeve 4 is moved further outwards and that the flaps 201-204 have swivelled more upwards. Finally, FIG. 12***d* and FIG. 13*d* show the state in which the valve 1 is fully open. The valve head flaps 201-204 have swivelled to an axially extending orientation, the tips of the flaps 201-204 pointing in a direction away from the flange 3. In FIGS. 12*d* and 13*d* can also be seen that the connector sleeve is further moved outwardly. The indentations 25-28 have thus become a larger radius of curvature which can be seen from the sequence of FIGS. 12*a*-12*d*. The connector sleeve 4 moves the most outwardly at the indentations and the least at the tip regions of the lobes, although also in the latter regions there is a slight movement outwardly as is visible in the sequence of FIGS. 12*a*-12*d* and FIGS. 13*a*-13*d*.

The valve 1 thus opens by a combined axial movement of the flaps 201-204 and a radial movement of the connector sleeve 4, which pulls the flaps 201-204 apart. The mentioned radial movement is facilitated by the lobed shape of the valve head 2, which radial movement would not be present to this extent if the valve head would have had a conventional circular outer contour. The depth of the indentations, or in other words the curvature of the indentations has a positive effect on the opening of the valve slits. The shallower the indentations the lesser the radial movement of the flaps 201-204 which opens the slits.

Especially in the event that the valve is made of a stiffer material than the common silicone rubber, the common valve with a circular valve head contour would not open sufficiently, because the valve head flaps would be stiffer and inherently have a larger bending resistance which would lead to a smaller dispensing orifice in the open state of the valve. The lobed shape of the valve head 2 provides the solution for this problem, because it also allows a radial yielding of the valve head flaps 201-204, whereby an overall larger orifice can be achieved than with a common valve design with a circular valve head.

Figure 13E:
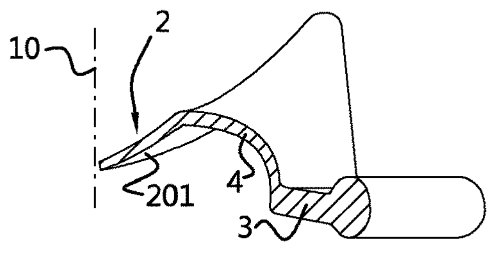

In FIG. 13*e* is shown the effect of suckback which is important if the valve is used to dispense a substance from e.g. a squeeze bottle. A squeeze bottle is squeezed by the user to increase the internal pressure in the bottle and force the substance out of the bottle. After the user relieves the pressure on the wall of the squeeze bottle, the bottle will want to return to its original undeformed shape by the elasticity of the bottle wall. However, an underpressure or vacuum in the bottle will inhibit the return of the bottle to its initial shape. Therefore the bottle has to be vented, which ideally takes place through the self-closing dispensing valve 1.

A disadvantage of the lobed shape of the valve head 2 occurs when the valve is closed and an underpressure occurs in the container under the valve. The radial force applied on the indentations in the outer valve contour then forces the valve head flaps 201-204 towards each other and hinders the opening of the valve 2 to allow suck back. To promote suck back, notwithstanding the lobed valve head contour having indentations, the cross sectional curvature of the adjoining connector sleeve towards the edge of the valve head is designed such that the adjoining connector sleeve portions provide a minimal radial force towards the centre axis of the valve. In FIG. 10*a* for example can be seen that the connector sleeve 4 faces only a little towards the centre axis 10 of the valve 1 due to a limited slope, while the valve head 2 has a negative slope, i.e. the inner convex surface of the valve head faces away from the centre axis 10. The curvature of the concave/convex shape of the valve head 2 determines inter alia how much the suck back with the valve 1 is promoted. The larger the curvature, the more the forces generated by an underpressure under the valve head will force the valve head flaps outwardly in radial direction. The overall pressure forcing the valve flaps 201-204 inwards will thus be overcome by the force of the valve flaps 201-204 to open the valve for a suckback effect.

In the above an embodiment is shown wherein the valve head has four lobes and the slits are straight.

Figure 14A:
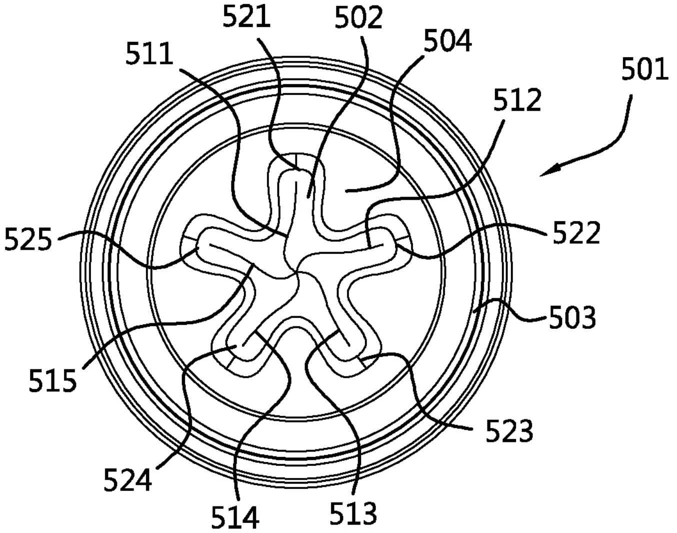
FIGS. 14*a*-14*c* show a top view of an alternative self-closing dispensing valve according to the invention in different states of opening.
Figure 14B:
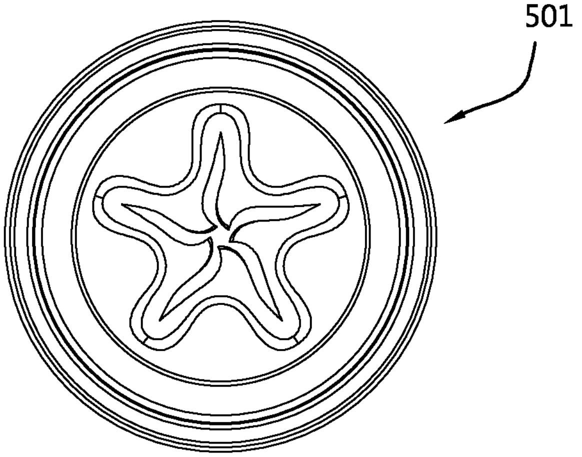
Figure 14C:
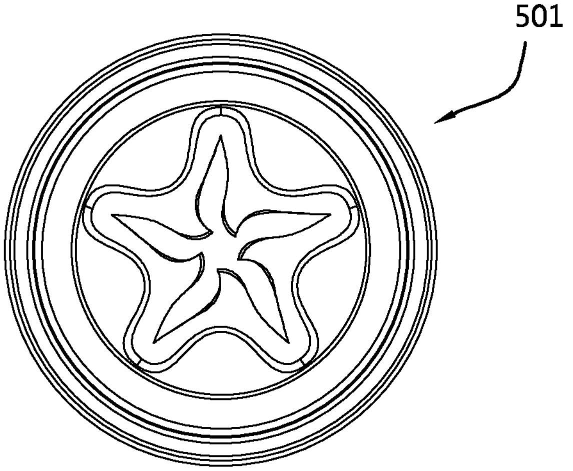

FIGS. 14*a*-14*c* show by way of example a valve 501 according to the invention, having a valve head 502, a valve flange 503 and a connector sleeve 504. The valve head 502 has five lobes 521-525. The outer contour of the valve head 502 thus has substantially a five point star shape. The valve head 502 has five slits 511-515 extending from the centre of the valve head 502 into the respective points of the star shape. It was found that five-lobed valve heads provide a smaller dispensing orifice when the valve is pressurized from the inside, which may be advantageous for dispensing particular substances, for example when a decorative effect is to be achieved. With the present embodiment of the valve 501 according to the invention a decorative beam of substance can be dispensed together with a clean cut-off of the beam after the dispensing is stopped.

The slits 511-515 in this example are not straight but curved. This produces a certain shape of the dispensing orifice which is visible in FIG. 14*c*, whereby the product to be dispensed can be given a certain outer shape. This can be utilized for decorative and/or edible substances to be dispensed which remain form stable after dispensing, such as for example cream or cake icing.

Figure 15A:
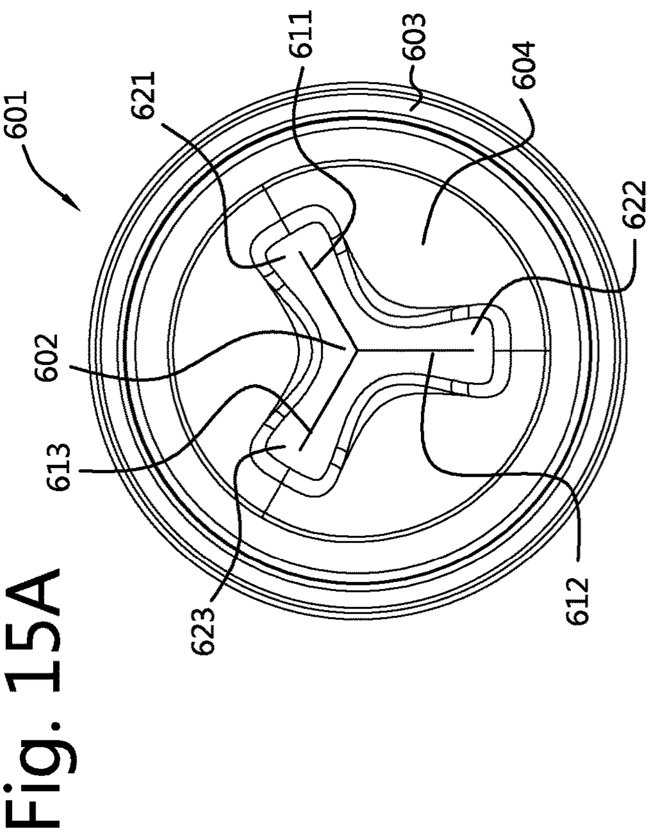
FIGS. 15*a*-15*b* show a top view and a view in perspective, respectively, of another alternative self-closing dispensing valve according to the invention.
Figure 15B:
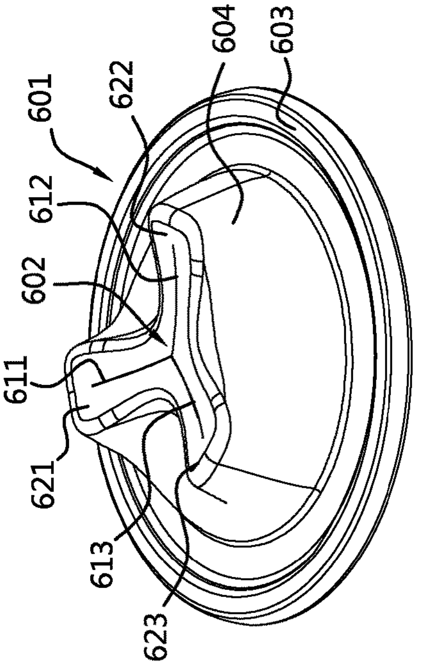

FIGS. 15*a* and 15*b* show by way of example a valve 601 according to the invention, having a valve head 602, a valve flange 603 and a connector sleeve 604. The valve head 602 has three lobes 621-623. The outer contour of the valve head 602 thus has substantially a three point star shape as can be best seen in FIG. 15*a*. The valve head 602 has three slits 611-613 extending from the centre of the valve head 602 into the respective points of the star shape.

Figure 16A:
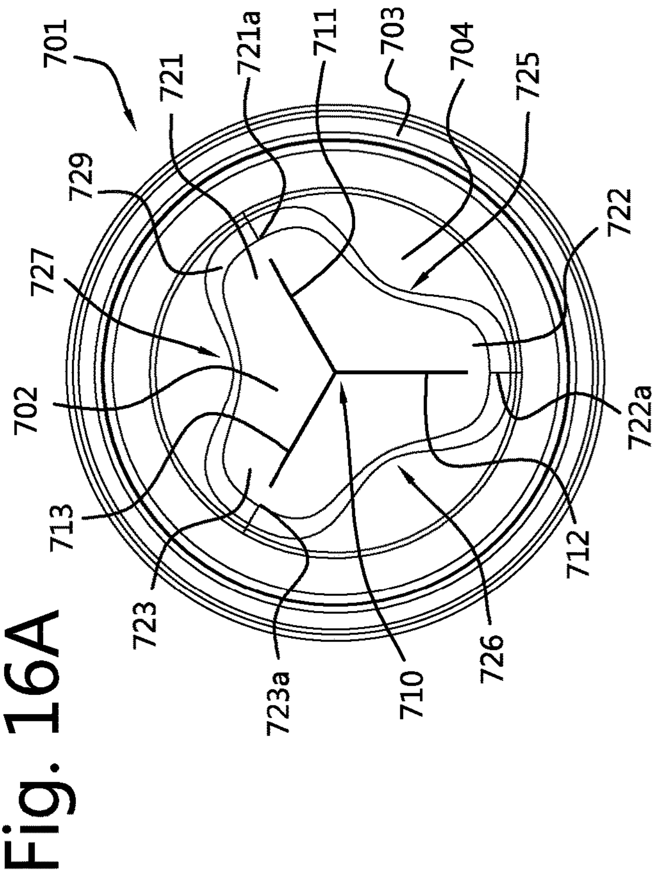
FIGS. 16*a*-16*b* show a top view and a view in perspective, respectively, of a preferred embodiment of a self-closing dispensing valve according to the invention.
Figure 16B:
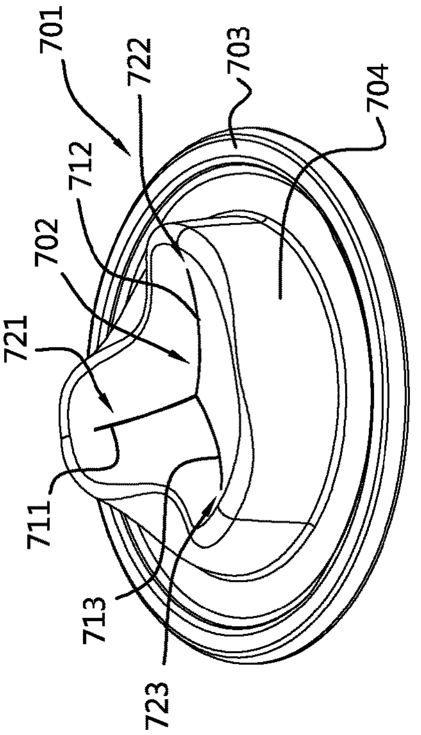

FIGS. 16*a* and 16*b* show a preferred embodiment of a self-closing valve according to the invention. The valve 701 has a valve head 702, a valve flange 703 and a connector sleeve 704. The valve head 702 has three lobes 721-723. The outer contour of the valve head 702 thus has substantially a three point lobed shape as can be best seen in FIG. 16*a*. The valve head 702 has three slits 711-713 extending from the centre of the valve head 702 into the respective points of the lobed shape.

It was found that the valve head 702 having three lobes 721-723, which results generally in a three point lobed shape, a bigger plane dispensing opening is achieved when the valve is pressurized from the interior side. This may in particular be advantageous when certain substances with a certain viscosity have to be dispensed. In particular this shape may be advantageously used with substances having a high viscosity or for example sauces containing small particles.

Figure 16D:
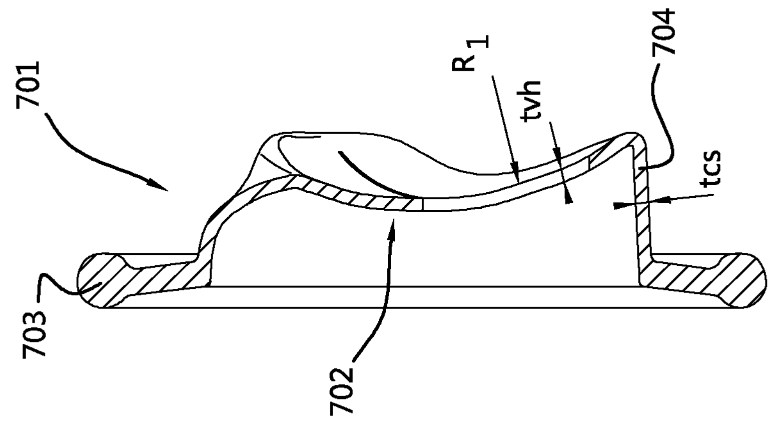
FIGS. 16*c*-16*d* show a top view with dimensions and a cross section according to the line A-A indicated in FIG. 16*c*, respectively.
Figure 16C:
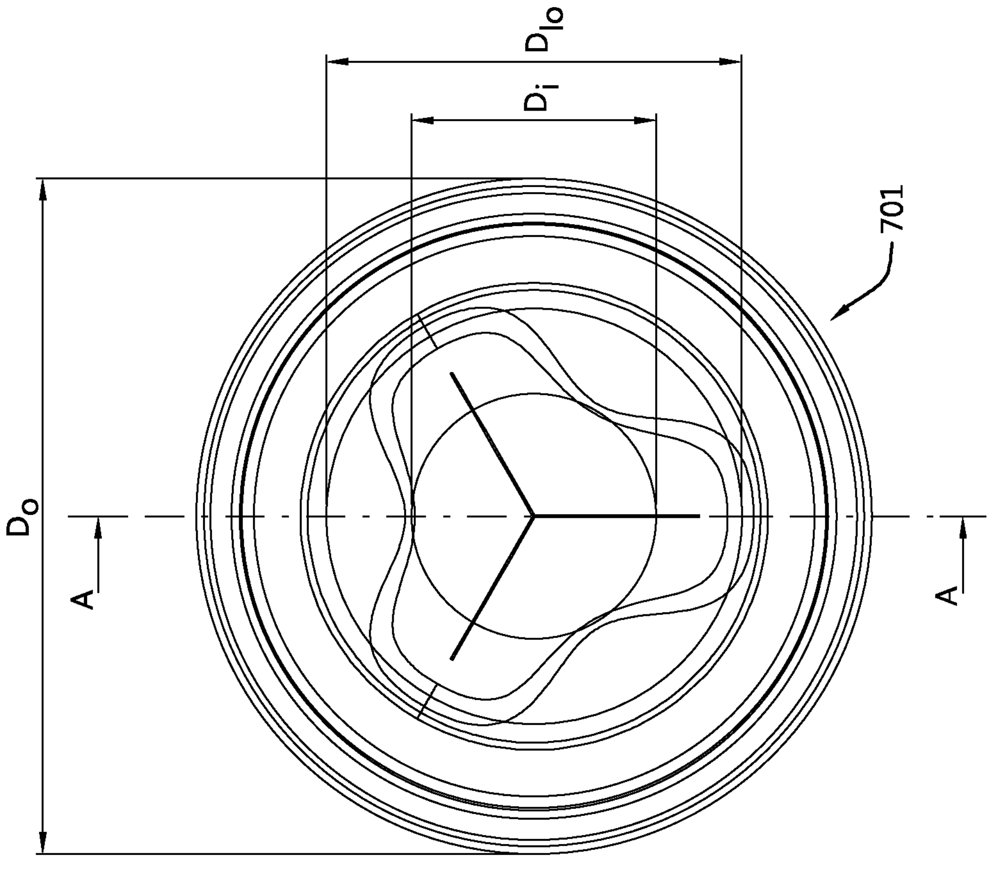

Each of the lobes 721-723 has a tip region 721*a*-723*a* on a radial outer end of the lobe 721-723. The tip regions 721*a*-723*a* of the respective lobes 721-723 lie approximately on an imaginary circle, which is illustrated in FIG. 16*c* having a diameter $D_{lo}$. Consecutive tip regions 721*a*-723*a* are interconnected by an indentation 725-727 formed in the peripheral contour 729 of the valve head 702 relative to a circle shape. The three slits 711-713 extend from the centre 710 of the valve head 702 into the lobes 721-723.

The imaginary circle on which the tip regions 721*a*-723*a* of the respective lobes 721-723 lie has in the embodiment shown in the FIGS. 16*a*-16*c*, a similar diameter $D_{lo}$ as the inner contour of the flange 703, which is best visible in FIGS. 16*a* and 16*c*. A radial outer portion of the connector sleeve 704 extends between the retaining flange 703 and each one of the tips of the lobes 721-723. In an unloaded state of the valve 701, this radial outer portion of the connector sleeve 704 extends substantially parallel to the centre axis 710 of the valve 701, which is visible in FIG. 16*b*.

It is however also possible that the mentioned imaginary circle, on which the tip regions of the respective lobes lie, has a smaller diameter than the inner contour of the retaining flange. This is for example the case in the valve 601 shown in FIGS. 15*a* and 15*b*. In such an embodiment a radial outer portion of the connecting sleeve 604 extending between the retaining flange 603 and each one of the tips of the lobes 621-623 has an inclination with respect to the axial direction of the valve 601, such that the radial outer portions of the connector sleeve 604 define an imaginary frusto-conical shape. The mentioned inclination is visible in FIG. 15*b* when compared with FIG. 16*b*.

Just as an indication of dimensions, a practical embodiment of the valve 701 is made of a plastomer, and has a retaining flange with an outer diameter $D_o$ of about 16.4 mm as is shown in FIG. 16*c*. The imaginary circle on which the tip regions 721*a*-723*a* of the respective lobes 721-723 lie has a diameter $D_{lo}$ of about 10 mm. The tip of the indentations 725-727 also lie on an imaginary circle (cf. FIG. 16*c*) which has a diameter $D_i$ of about 6 mm. The valve head 702 has a concave exterior side which has a radius of curvature R1, indicated in FIG. 16*d*. In a practical embodiment the radius of curvature is 8 mm. The connector sleeve 704 has a thickness $t_{cs}$ of 0.30 mm. The valve head has a tapering thickness $t_{vh}$ toward the centre. The thickness $t_{vh}$ at the centre is preferably about ⅔ of the thickness $t_{vh}$ at the radial outer edge. In the practical embodiment shown, the thickness at the outer edge is 0.3 mm and tapers towards the centre to a thickness of 0.2 mm.

Compared to the four lobed valve 1 of FIGS. 1-6 having a same outer diameter $D_o$ and comparable wall thicknesses, the three lobed valve 701 as shown in FIGS. 16*a*-16*c* provides a more round dispensing opening when the valve is in an open state. This may be advantageous for some applications. Furthermore, the valve 701 opens at a lower threshold pressure.

Compared to the three lobed valve 601 of FIGS. 15*a* and 15*b* (having the same outer diameter $D_o$), the three lobed valve 701 also has a lower threshold pressure to open. Furthermore it was found that the valve 701 provides a better suckback behaviour, i.e. it better facilitates venting air to enter through the valve into the squeezed container, which has to return to its original shape. Without wishing to be bound to a certain theory it is believed that the improved suckback behaviour is due to the larger valve head surface of the valve 701 which is able to move inwards, when compared to the valve head 601. Moreover the larger diameter $D_{lo}$ allows longer slits 711-713, with respect to slits 611-613, which also improves suckback behaviour.

The invention claimed is:

1. A self-closing dispensing valve for dispensing food products from a container made of an elastic material, the valve comprising a valve head with a dispensing orifice, a circular peripheral retaining flange spaced apart from the valve head in an axial direction, and a connecting sleeve integrally connected with the valve head on one end and the retaining flange on another end, wherein the dispensing orifice is formed by at least three slits in the valve head, wherein said slits converge at a centre of the valve head and are angularly evenly distributed around the centre of the valve head, wherein the valve head comprises a number of lobes, wherein in each of said lobes at least one of said slits is formed, wherein each of the lobes has a tip region on a radial outer end of the lobe, wherein the tip regions of the respective lobes lie approximately on an imaginary circle, and wherein consecutive tip regions are interconnected by an indentation formed in the peripheral contour of the valve head relative to a circle shape, wherein the connector sleeve has a shape defined by contour lines, wherein said contour lines in the axial direction from the valve head to the flange make a gradual transition of the lobed shape of the peripheral contour of the valve head to a circular inner contour of the retaining flange, wherein the valve head has a concave exterior surface, the exterior surface facing away from the flange in an axial direction, and wherein the elastic material is compatible with food products and is selected from the group consisting of a thermoplastic elastomer (TPE), a non-TPE elastomer, or a plastomer material.

2. The self-closing dispensing valve according to claim 1, wherein in each lobe one slit is formed extending towards the centre of the valve head.

3. The self-closing dispensing valve according to claim 1, wherein the outer contour of the valve head has generally a cross shape and wherein the valve head has four slits extending from the centre of the valve head into arms of the cross shape.

4. The self-closing dispensing valve according to claim 1, wherein the outer contour of the valve head has generally a three point star shape and the valve head has three slits extending from the centre of the valve head into the respective points of the star shape.

5. The self-closing dispensing valve according to claim 1, wherein the outer contour of the valve head has substantially a five point star shape and the valve head has five slits extending from the centre of the valve head into the respective points of the star shape.

6. The self-closing dispensing valve according to claim 1, wherein the valve is made of a non-silicone material.

7. The self-closing dispensing valve according to claim 1, wherein the valve is formed as a single body.

8. The self-closing dispensing valve according to claim 1, wherein the slits are rectilinear.

9. The self-closing dispensing valve according to claim 1, wherein the slits have at least partly a curved portion.

10. The self-closing dispensing valve according to claim 1, wherein the valve head has a concave upper surface.

11. The self-closing dispensing valve according to claim 1, wherein the valve has an overall uniform wall thickness.

12. The self-closing dispensing valve according to claim 1, wherein the radially most inward point of the respective indentations lie on an imaginary inner circle delimiting a centre region of the valve head.

13. The self-closing dispensing valve according to claim 12, wherein the valve has a smaller thickness at said centre region of the valve head than in the remainder of the valve.

14. The self-closing dispensing valve according to claim 13, wherein said remainder of the valve has a uniform wall thickness.

15. The self-closing dispensing valve according to claim 14, wherein the valve has a wall thickness of about 0.2 mm at the centre region of the valve head and a wall thickness of about 0.3 mm in the remainder of the valve.

16. The self-closing dispensing valve according to claim 12, wherein the centre region of the valve head has a dome shape.

17. The self-closing dispensing valve according to claim 12, wherein the centre region of the valve head has a conical shape.

18. A self-closing dispensing valve comprising a valve head with a dispensing orifice, a circular peripheral retaining flange spaced apart from the valve head in an axial direction, and a connecting sleeve integrally connected with the valve head on one end and the retaining flange on another end, wherein:

the self-closing dispensing valve is formed as a single body moulded from a single elastic material, the valve head has a concave exterior surface, the exterior surface facing away from the flange in an axial direction, the dispensing orifice is formed by at least three slits in the valve head, wherein said slits converge at a centre of the valve head and are angularly evenly distributed around the centre of the valve head, the valve head comprises a number of lobes, wherein in each of said lobes at least one of said slits is formed, each of the lobes has a tip region on a radial outer end of the lobe, wherein the tip regions of the respective lobes lie approximately on an imaginary circle, and consecutive tip regions are interconnected by an indentation formed in the peripheral contour of the valve head relative to a circle shape, and the connector sleeve has a shape defined by contour lines, wherein said contour lines in the axial direction from the valve head to the flange make a gradual transition of the lobed shape of the peripheral contour of the valve head to a circular inner contour of the retaining flange, wherein the valve is configured to dispense a substance when a pressure at the exterior surface is smaller than a pressure at an opposite interior surface of the valve head and to suck back a volume of air when a pressure at the exterior surface is larger than a pressure at the interior surface.

* * * * *